United States Patent [19]
Faille et al.

[11] Patent Number: 5,960,187
[45] Date of Patent: Sep. 28, 1999

[54] METHOD FOR FORMING A SIMULATION MODEL OF TRANSIENT TWO-PHASE FLOWS IN PIPELINES

[75] Inventors: Isabelle Faille, Carrière-sur-Seine; Eric Heintze, Meudon, both of France

[73] Assignee: Institut Francais du Petrole, Rueil-Malmaison, France

[21] Appl. No.: 08/971,164

[22] Filed: Nov. 14, 1997

[30] Foreign Application Priority Data

Nov. 18, 1996 [FR] France ................................ 96 14125

[51] Int. Cl.$^6$ ................................ G06G 7/48; G06G 7/57
[52] U.S. Cl. ................................ 395/500.33; 395/500.3
[58] Field of Search ................ 364/578; 395/500.31, 395/500.3

[56] References Cited

U.S. PATENT DOCUMENTS

| | | | |
|---|---|---|---|
| 5,550,761 | 8/1996 | Pauchon | 364/578 |
| 5,801,969 | 9/1998 | Nagahama | 364/578 |

OTHER PUBLICATIONS

*Society of Petroleum Engineers* (SPE #21755), Mar. 20, 1991, entitled "Compositional Reservoir Simulation, A New, Efficient, Fully Integrated Solution Technique for the Flow/Thermodynamic Equilibrium Equations" by F.M. Guehria et al, pp. 55–68 (XP002035429).

*Primary Examiner*—Kevin J. Teska
*Assistant Examiner*—Hugh Jones
*Attorney, Agent, or Firm*—Antonelli, Terry, Stout & Kraus, LLP

[57] ABSTRACT

The invention relates to a method for forming a simulation model of two-phase flow in pipelines and notably in pipelines carrying hydrocarbons. The method comprises solving mass conservation equations for each of the phases and an equation of momentum conservation of the flow, while complying with closing relations. An explicit solution is used on slow waves (corresponding to the propagation of a gas phase) and fast waves (corresponding to the propagation of the pressure waves), which has the advantage of allowing time interval control by the slow waves while keeping the accuracy on these waves inherent in an explicit scheme. The method thus combines model execution speed and accuracy of results. The method can be applied to the design of a hydrocarbon transportation network.

2 Claims, 3 Drawing Sheets

METHOD FOR FORMING A SIMULATION MODEL OF TRANSIENT TWO-PHASE FLOWS IN PIPELINES

BACKGROUND OF THE INVENTION

1. Field of the Invention

The present invention relates to a method of simulation of two-phase flow in pipes and notably hydrocarbon flow in a petroleum pipeline.

2. Description of the Prior Art

U.S. Pat. No. 5,550,761 describes a method for modeling the flows of two-phase mixtures in pipes using partial differential equations system comprising equations of mass conservation for the liquid and gas phase of the mixture and of total momentum conservation of the mixture. These equations are written as follows:

$$\frac{\partial}{\partial t}[\rho_G R_G] + \frac{\partial}{\partial x}[\rho_G R_G V_G] = 0$$

$$\frac{\partial}{\partial t}[\rho_L R_L] + \frac{\partial}{\partial x}[\rho_L R_L V_L] = 0$$

$$\frac{\partial}{\partial t}[\rho_G R_G V_G + \rho_L R_L V_L] + \frac{\partial}{\partial x}[\rho_G R_G V_G^2 + \rho_L R_L V_L^2 + P] = T^w - \rho g \sin\theta$$

(1)

where $R_G$ (resp. $R_L$) is the volume fraction of gas (resp. liquid), $V_G$ (resp. $V_L$) is the velocity of the gas (resp. liquid) phase, P is the pressure, $\rho = \rho_G R_G + \rho_L R_L$ is the average density of the mixture, $T^w$ represents data depending on unknowns which represents the wall friction term, g is the acceleration of gravity and $\theta$ is the angle formed by the pipe with respect to the horizontal.

Three types of closing equations are added thereto:

1) a "conservative" closing law expressed in the form:

$R_L + R_G = 1$ 2) a hydrodynamic closing law written in the form:

$\Phi(V_M, x_G, \Gamma(P,T), dV, x) = 0$ where:

$V_M$ is the average velocity of the two-phase mixture,
$x_G$ is the mass fraction of gas $$\left( x_G = \frac{\rho_G R_G}{\rho_G R_G + \rho_L R_L} \right),$$

$\Gamma(P,T)$ represents all of the physical properties of the fluids,

T is the temperature, $dV = V_G - V_L$ is the slip velocity between the two phases 3) thermodynamic closing laws.

The partial differential equations system (1) is written in a conservative vectorial form:

$$\frac{\partial}{\partial t}(W) + \frac{\partial}{\partial x}(F(W,x)) = Q(W,x) \quad (2)$$

$$\text{where } W = \begin{pmatrix} \rho_L R_L \\ \rho_G R_G \\ \rho_L R_L V_L + \rho_G R_G V_G \end{pmatrix},$$

F et Q are expressed as a function of W by means of hydrodynamic and thermodynamic laws but without an analytical expression for F(W,x) and Q(W,x).

The Jacobian matrix of the system with W is written:

$$A(W,x) = \frac{\partial F}{\partial W}(W,x).$$

The eigenvalues $\lambda_1$, $\lambda_2$ and $\lambda_3$ of A(W,x) are real and satisfy $\lambda_1(W) < \lambda_2(W) < \lambda_3(W)$. They meet $\lambda_1(W) < 0$, $\lambda_3(W) > 0$. Furthermore, $\lambda_1$ and $\lambda_3$ are greater than $\lambda_2$ by at least one order of magnitude.

Modeling two-phase flows requires solving a relatively complex non linear hyperbolic partial differential equation system. It is well-known to use either an explicit or an implicit methodology to solve this type of non linear hyperbolic system. The drawback of the implicit methodology is poor accuracy. An explicit methodology produces more accurate results but, requires a time interval for solution that is difficult to use for two-phase flow in pipes because of particular constraints.

As mentioned above, the system of equations represents characteristics of having eigenvalues whose orders of magnitude are very different. Eigenvalues $\lambda_1$ and $\lambda_3$ are related to the velocities of the pressure waves in the pipe, which are of the order of several ten to several hundred m/s, thus much higher than the velocity of the fluids which is of the order of several m/s. The other eigenvalue, $\lambda_2$, is related to the propagation velocity of the gas fraction in the pipe. With an explicit scheme, the time interval is determined by the greatest eigenvalue and it is thus relatively short with the present application.

This constraint is not compatible with an explicit methodology if the time interval value is within a reasonable calculating time range. One solution to avoiding this difficulty, is well-known and adopts an implicit solution methodology allowing selection of a greater time interval. On the other hand, the implicit methodology introduces a numerical diffusion which makes the results obtained less accurate, notably for slow waves.

SUMMARY OF THE INVENTION

The method of modeling two-phase mixture flows in pipes according to the invention allows the aforementioned difficulties to be avoided.

The method comprises solving mass conservation equations for each of the phases of the mixture and an equation of momentum conservation of the mixture while complying with closing relations.

An explicit solution methodology is used on slow waves corresponding to the propagation of the gas fraction in the pipe and an implicit solution methodology is used on fast waves corresponding to the propagation of the pressure waves to provide time interval control by the slow waves while maintaining the accuracy regarding slow waves inherent in the explicit methodology.

BRIEF DESCRIPTION OF THE DRAWINGS

Other features and advantages of the method according to the invention will be clear from reading the description hereafter of embodiments given by way of non limitative examples, with reference to the accompanying drawings wherein.

DESCRIPTION OF THE INVENTION

MODELING

Figure 1:
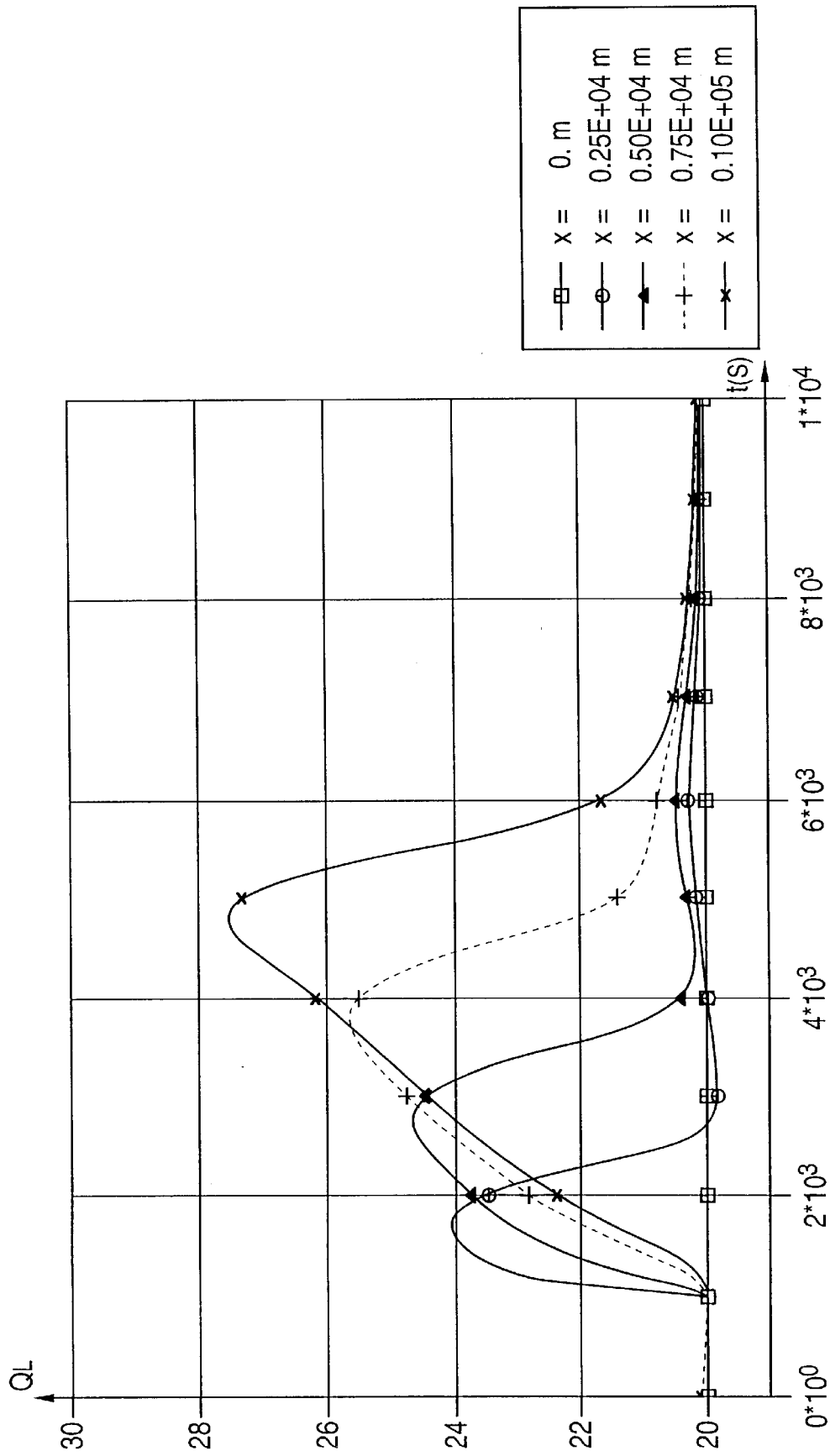
FIG. 1 shows variation curves of the mass flow rate of liquid with time t, at various points of abscissa x of a pipe, when a certain gas mass flow rate fluctuation is imposed at the inlet (upstream), with an implicit methodology of modeling.

For modeling of the flow, the pipe is defined in a set of I grid cells. Grid cell i is denoted by $M_i$ and its ends are points $x_{i-\frac{1}{2}}$ and $x_{i+\frac{1}{2}}$. Let $\Delta x_i = x_{i+\frac{1}{2}} - x_{i-\frac{1}{2}}$, $x_i = \frac{1}{2}(x_{i+\frac{1}{2}} - x_{i-\frac{1}{2}})$. The discrete unknowns $W_i$, i=1, ..., I, are located at the centers of the grid cells.

A finite volume solution methodology is obtained by integrating on each grid cell $M_i$:

$$\frac{d}{dt}(W_i)\Delta x_i + H_{i+1/2} - H_{i-1/2} = Q_i \Delta x_i$$

where $H_{i+\frac{1}{2}}$ is the numerical flow at $x_{i+\frac{1}{2}}$ at the time t, approximation to F at $x_{i+\frac{1}{2}}$:

$$H_{i+\frac{1}{2}} = F(W_{i-p+1}, \ldots, W_{i+p-1}, W_{i+p}).$$

The following scheme is used for modeling:

$$H_{i+1/2} = \frac{1}{2}(F(W_i) + F(W_{i+1})) + KD_{i+1/2}(W_i - W_{i+1}) \quad (3)$$

In this relation, the flow is considered to be the sum of a centered term $(F(W_i)+F(W_{i+1}))/2$ and of a term $KD_{i+\frac{1}{2}}(W_i-W_{i+1})$ where $D_{i+\frac{1}{2}}$ is a diffusion matrix formed from the Jacobian matrices $A_i=A(W_i)$ and $A_{i+1}=A(W_{i+1})$, and K is a positive real parameter.

After defining this space, the system of equations is written in the form $$\frac{d}{dt}(W_i) = L_i(W_j, j=1\ldots I) \quad (4)$$

Defining of time remains to be performed.

Explicit stage

The explicit Eulerian methodology that can be used to perform this defining of time is written:

$$\frac{W_i^{n+1} - W_i^n}{\Delta t} = L_i(W_j^n, j=1\ldots I),$$

and requires a CFL (Current Friedrich Levy) type time interval limitation controlled by the greatest eigenvalue. For the solution scheme of relation (3), this limitation is written:

$$\Delta t \leq CFL\text{Min}\left(\frac{\text{Min}(\Delta x_i, \Delta x_{i+1})}{K\text{Max}(|\lambda^i{}_k|, k=1, 3)}, i=1, \ldots, I\right) \quad (5)$$

where CFL represents a positive number less than or equal to 1.

Implicit Stage

The condition imposed by relation (5) is too restrictive in practice and leads to long calculating times since the time interval is determined by the greatest eigenvalue $\lambda_3$, itself linked with the velocity of the pressure waves in the pipe, which is of the order of several ten to several hundred m/s, whereas the velocity of the fluids in the pipe is of the order of several m/s. This constraint is not compatible with an explicit methodology if the time interval value is to remain within a reasonable calculating time range. In order to avoid the implicit numerical methodology which, although it allows a longer time interval, produces on the other hand much less accurate results, the method according to the invention thus uses an explicit methodology on slow waves associated with the eigenvalue $\lambda_2$ corresponding to the propagation of the gas fraction in the pipe and an implicit methodology on the fast pressure waves associated with $\lambda_1$ and $\lambda_3$.

Order 1 In Time

By adopting an implicit Eulerian method, relation (4) is written:

$$\frac{W_i^{n+1} - W_i^n}{\Delta t} = L_i(W_j^{n+1}, j=1\ldots I)$$

This definition is not subjected to a CFL type condition but it requires, at each time interval, solution of a non linear system between the unknowns $(W_j^{n+1}, j=1\ldots I)$. Since this solution is generally too complex linearly implicit methodology of approximating to $L_i(W_j^{n+1}, j=1\ldots I)$ by means of a linear combination of $(W_j^{n+1}, j=1\ldots I)$ are used.

The system of equations (2) defined to the order 1 in space is written:

$$L_i(W_j^{n+1}, j=1\ldots I) =$$
$$-\frac{1}{\Delta x_i}(H_{i+1/2}(W_i^{n+1}, W_{i+1}^{n+1}) - H_{i-1/2}(W_{i-1}^{n+1}, W_i^{n+1})) + Q_i^{n+1}$$

$H(W_i^{n+1}, W_{i+1}^{n+1})$ is made by means of a Taylor development to the order with respect to $W_i^n$ and $W_{i+1}^n$.

This scheme is linearly implicit for all the waves. In order to maintain a good accuracy on the slow waves, only the implicit methodology of quantities relative to the fast waves is performed in $H(W_i^{n+1}, W_{i+1}^{n+1})$. Only the terms linked with eigenvalues $\lambda_1$ and $\lambda_3$ in the partial derivatives of H are kept. The methodology thus obtained is subjected to a CFL condition which is much less restrictive than that of relation (5) because only the slow wave is involved $$\Delta t \leq CFL\text{Min}\left(\frac{\text{Min}(\Delta x_i, \Delta x_{i+1})}{K\text{Max}(|\lambda^i{}_2|)}, i=1, \ldots, I\right)$$

The time interval is thus much longer than with the explicit methodology and greater accuracy is obtained on the fronts propagating with the velocity $\lambda_2$.

ORDER 2 IN TIME

Generalization of the methodology to the order 2 in time is performed in a well-known way by means of a Runge- Kutta method (Henn methodology) that is notably described by Le Veque R. J., 1992, Numerical methods for conservation laws, Lectures in Mathematics, ETH Zurich, Birkhäuser.

Simulation results

The method according to the invention has been tested by performing simulations of flows in pipes. The results shown hereunder by way of example relate to the effect produced on the flow of gas at the outlet of a horizontal line when the following boundary conditions are imposed:

Upstream boundary:

$Q_L(t)=20$ kg/s for $t \geq 0$ s $Q_G(t)=0.2+0.02$ t for $0 \leq t \leq 10$ s $Q_G(t)=0.4$ for $t>10$ s $Q_L$ and $Q_G$ representing respectively the mass flow rate of liquid and of gas.

Downstream boundary:

$P(t)=1$ MPa for $t \geq 0$ s.

The space interval used is constantly 200 m. The quantity which is of interest to petroleum personnel is the liquid flow rate at the pipe outlet. The curves show the evolution of the liquid flow rate with time at various points of the pipe and in particular on the downstream boundary. The results obtained for the explicit methodology, the implicit methodology and the explicit methodology on void fraction waves (propagation of the gas fraction) and implicit on pressure waves are compared.

The calculating times are as follows:

Explicit scheme: 8704 s

Implicit scheme: 205 s

Explicit/implicit scheme: 218 s.

It can be seen that the explicit/implicit methodology requires a calculating time of the same order of magnitude as the time required for the implicit methodology, but it is 40 times less than the calculating time of the explicit methodology.

Figure 2:
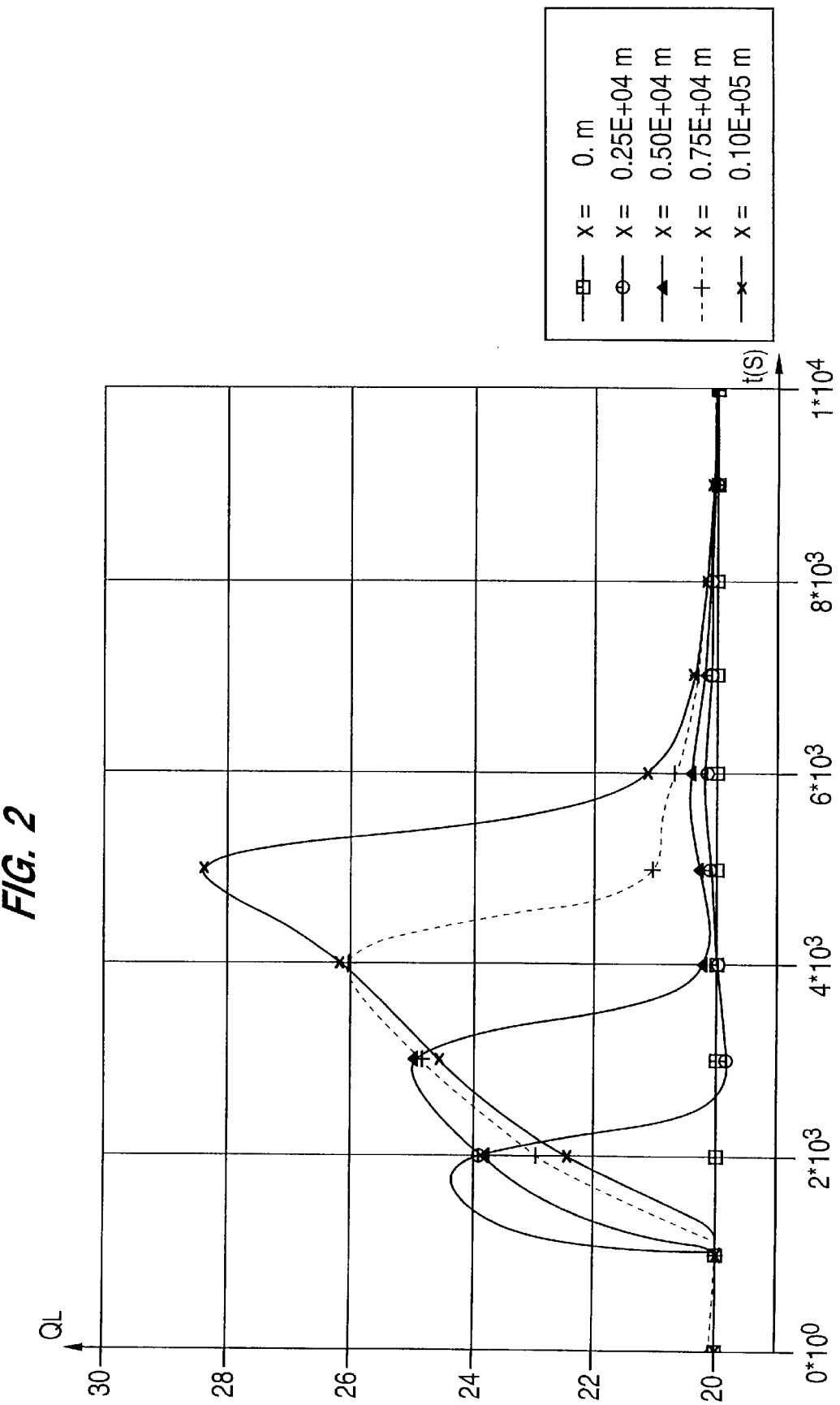
FIG. 2 shows, under identical conditions, the curves obtained with an explicit calculation methodology.
Figure 3:
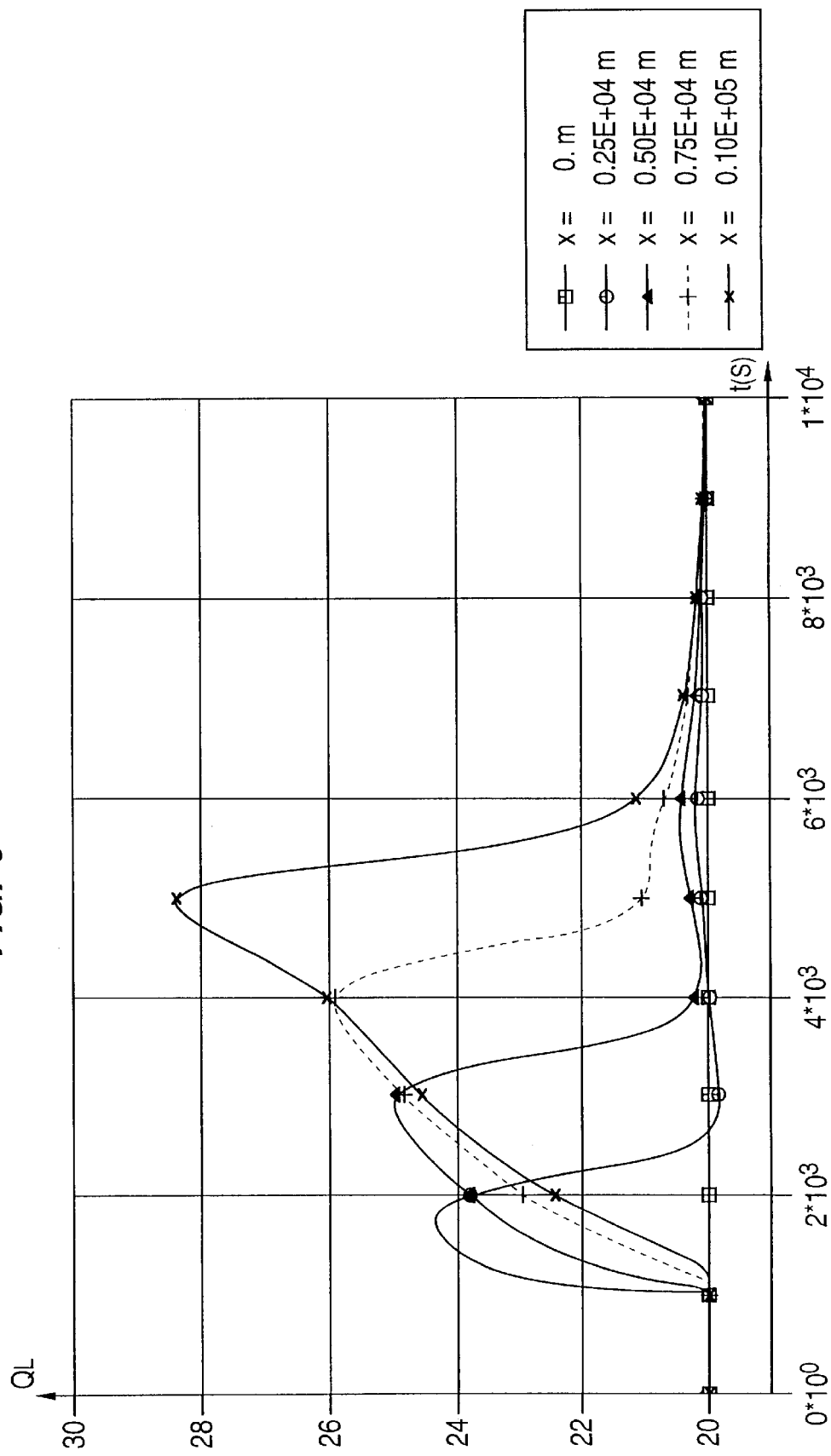
FIG. 3 shows, still under the same conditions, the curves obtained by adopting the mixed method of modeling according to the invention.

It can also be observed from the curves of FIGS. 1 to 3 that the accuracy obtained is equivalent when using the explicit methodology or the mixed explicit/implicit methodology of the invention, but it is much higher in accuracy than obtained with an implicit methodology.

We claim:

1. A method of determining a flow rate of a two-phase mixture at a location in a pipe comprising:

using an explicit solution methodology on slow waves corresponding to a propagation in the pipe of a gaseous fraction, and an implicit solution methodology for fast waves corresponding to a propagation in the pipe of pressure waves, which results in a time interval for solving the equations being controlled by the slow waves while obtaining an accuracy regarding the slow waves substantially obtainable from an explicit solution methodology to produce a model of the pipe; and using the model of the pipe to determine the flow rate of the two-phase mixture at a location in the pipe.

2. A method in accordance with claim 1 wherein:

the model further solves equations of conservation of mass for each of the phases in the mixture and of momentum of the two-phase mixture in compliance with closing laws.

* * * * *